US012752295B2

(12) United States Patent
Hatada

(10) Patent No.: US 12,752,295 B2
(45) Date of Patent: Oct. 6, 2026

(54) FINE PARTICLES SPACE PLACEMENT CONTROL SYSTEM, FINE PARTICLES SPACE PLACEMENT CONTROL METHOD, AND COMPUTER-READABLE STORAGE MEDIUM

(71) Applicant: Koji Hatada, Tokyo (JP)

(72) Inventor: Koji Hatada, Tokyo (JP)

( * ) Notice: Subject to any disclaimer, the term of this patent is extended or adjusted under 35 U.S.C. 154(b) by 918 days.

(21) Appl. No.: 17/538,170

(22) Filed: Nov. 30, 2021

(65) Prior Publication Data

US 2022/0088631 A1 Mar. 24, 2022

Related U.S. Application Data

(63) Continuation of application No. PCT/JP2021/017897, filed on May 11, 2021.

(30) Foreign Application Priority Data

Jun. 15, 2020 (JP) ................................ 2020-103081

(51) Int. Cl.
*B05B 17/06* (2006.01)
*F24F 1/0358* (2019.01)

(52) U.S. Cl.
CPC ........ *B05B 17/0653* (2013.01); *F24F 1/0358* (2019.02)

(58) Field of Classification Search
CPC .. B05B 12/08; B05B 7/02; B05B 1/10; B05B 1/24; B05B 17/0653; F24F 1/0358
See application file for complete search history.

(56) References Cited

U.S. PATENT DOCUMENTS 8,382,008 B1 * 2/2013 Ricciardi ............... G05B 15/02 239/338
2002/0171039 A1 * 11/2002 Bennett ..................... F42B 4/00 250/573

FOREIGN PATENT DOCUMENTS

| | | | | |
|---|---|---|---|---|
| GB | 2524773 | * | 10/2015 | F01N 3/005 |
| JP | 5427844 B2 | | 3/1979 | |
| JP | H06262110 A | | 9/1994 | |
| JP | 6348217 A | | 12/1994 | |
| JP | 2003297118 A | | 10/2003 | |
| JP | 2018104957 A | | 7/2018 | |
| JP | 6506712 B2 | | 4/2019 | |
| KR | 20020023790 | * | 3/2002 | B05B 17/06 |
| WO | 2008093721 A1 | | 8/2008 | |
| WO | WO-2013061248 A1 | * | 5/2013 | A61M 11/00 |

OTHER PUBLICATIONS

International Search Report issued on Jul. 6, 2021 in corresponding International Application No. PCT/JP2021/017897; 2 pages.

* cited by examiner

*Primary Examiner* — Christopher R Dandridge
(74) *Attorney, Agent, or Firm* — Maier & Maier, PLLC

(57) ABSTRACT

A fine particles space placement control system includes a fine particles generator configured to generate fine particles in a predetermined space by applying external energy to a liquid or a solid and an irradiator configured to remove some of the fine particles generated by the fine particles generator by irradiating the some fine particles with infrared light.

16 Claims, 10 Drawing Sheets

FINE PARTICLES SPACE PLACEMENT CONTROL SYSTEM, FINE PARTICLES SPACE PLACEMENT CONTROL METHOD, AND COMPUTER-READABLE STORAGE MEDIUM

CROSS REFERENCE TO RELATED APPLICATION

This application is based upon and claims the benefit of priority from the prior Japanese Patent Application No. 2020-103081, filed Jun. 15, 2020 and PCT Patent Application No. PCT/JP2021/17897, filed May 11, 2021, the entire contents of all of which are incorporated herein by reference.

FIELD

Embodiments described herein relate to a fine particles space placement control system, fine particles space placement control method, and computer-readable storage medium.

BACKGROUND

There have been known apparatuses that pulverize a liquid by applying energy to the liquid.

Also, there have been known an atomization apparatus that aims to humidify an indoor space and atomizes water by giving ultrasonic vibration to the water.

When a mist is supplied to an indoor space, the mist hangs in the space. People may have a floating feeling or a feeling of release by viewing the mist hanging in the space. There has been proposed such a new use of an atomization apparatus, which is to generate a mist for viewing purposes.

However, conventional atomization apparatuses have had difficulty in retaining a mist supplied to a predetermined indoor space area, since the mist gradually scatters with time.

The present disclosure is characterized in that it provides a fine particles space placement control system capable of retaining fine particles forming a mist or the like in a predetermined space area.

DETAILED DESCRIPTION

In general, according to one embodiment, a fine particles space placement control system is disclosed including a fine particles generator configured to generate fine particles in a predetermined space by applying external energy to a liquid or a solid and an irradiator configured to remove some of the fine particles generated by the fine particles generator by irradiating the some fine particles with infrared light.

First Embodiment

Now, a first embodiment of the present invention will be described in detail with reference to the drawings.

Figure 1:
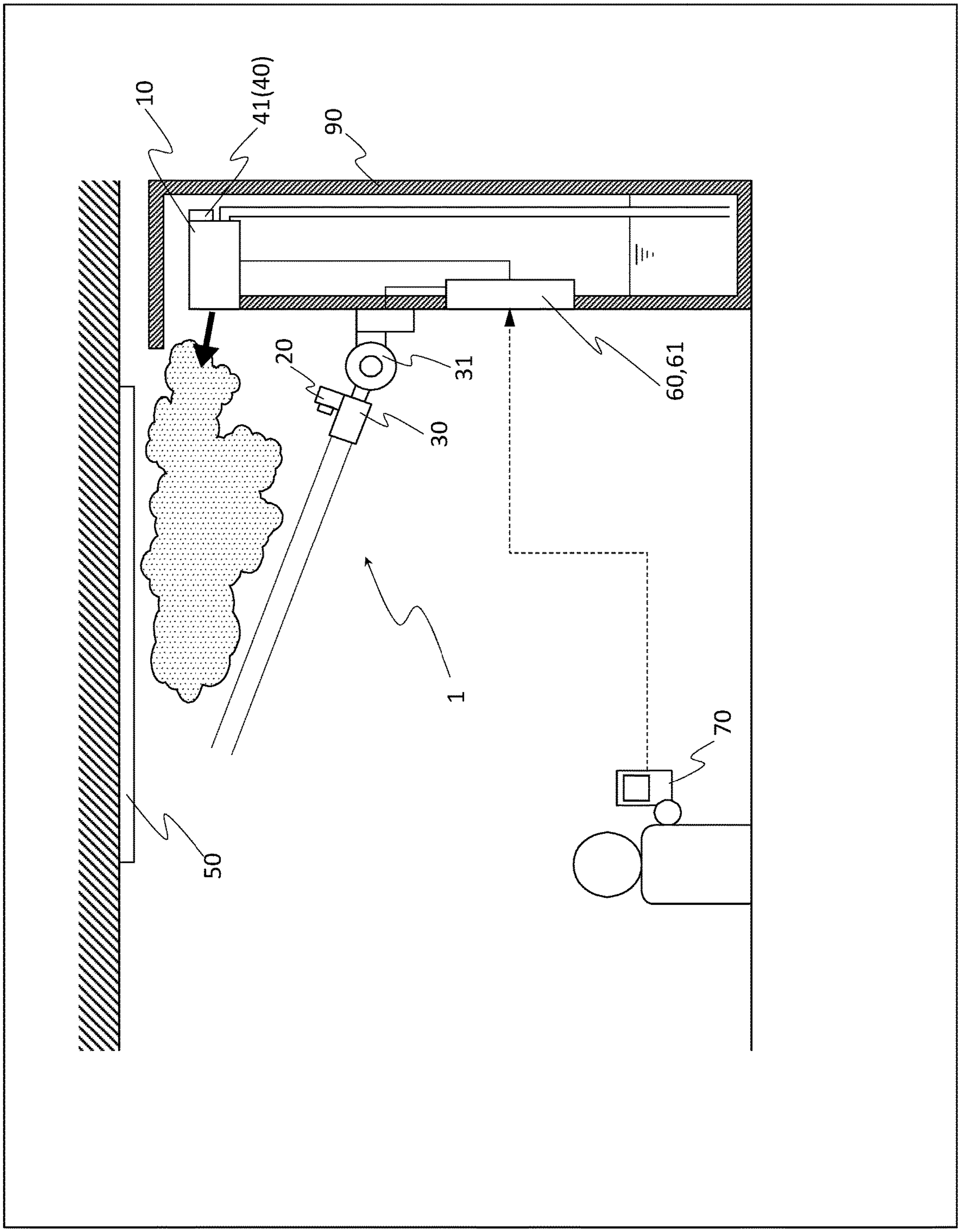
FIG. 1 is an external view of a fine particles space placement control system according to a first embodiment of the present invention.

The same components are basically given the same reference signs throughout the drawings and will not be described repeatedly. FIG. 1 is an external view of a fine particles space placement control system according to the first embodiment of the present invention.

(1) Overview of First Embodiment

An overview of the present embodiment will be described.

As shown in FIG. 1, a fine particles space placement control system 1 is, for example, a system that generates fine particles in a predetermined indoor space. As used herein, the term “fine particles” refers to fine, fluid substances that are generated by pulverizing a liquid or solid using external energy and are hanging in a space while maintaining a certain level of coherence. Examples of the fine particles include a cloud that occurs in the nature.

Note that the fine particles space placement control system 1 may be used outdoors rather than indoors.

Specifically, the fine particles space placement control system 1 is a system that artificially generates an object imitating a cloud (hereafter referred to as an “artificial cloud”) indoors. The artificial cloud generated indoors is used, for example, for viewing purposes.

The fine particles space placement control system 1 generates an artificial cloud having a shape desired by a user.

The user inputs, to a controller 60, information on the appearance of a sky that the user wants to generate by selecting image data displayed on an operation terminal 70 (for example, selecting among photographs of multiple skies) or selecting a condition (for example, inputting a predetermined area or predetermined period).

The operation terminal 70 is, for example, a portable terminal, such as a smartphone. The user may input the above information not only to the operation terminal 70 but also directly to the controller 60 (to be discussed later).

(2) Overall Configuration of Fine Particles Space Placement Control System 1

Figure 2:
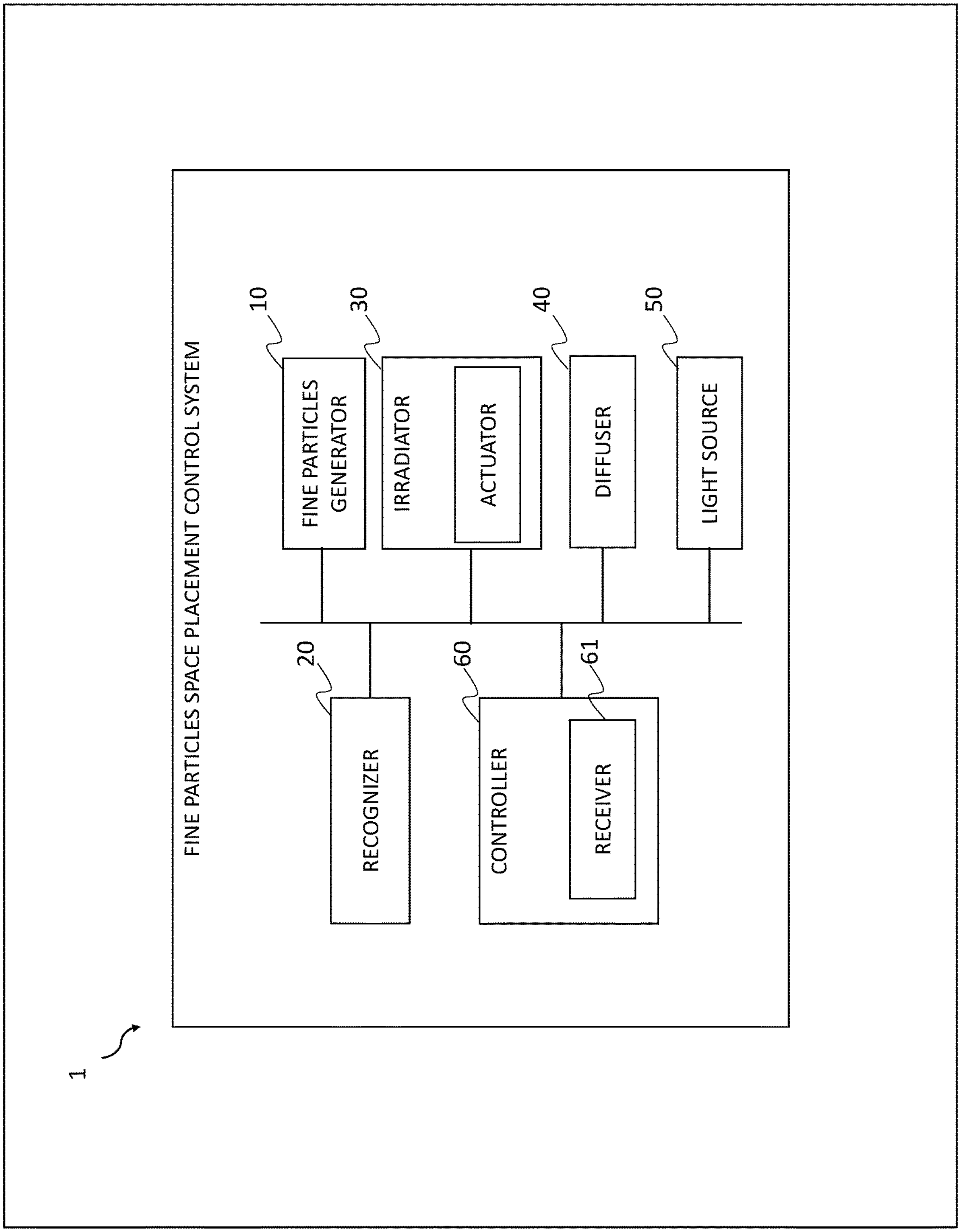
FIG. 2 is a block diagram showing the configuration of the fine particles space placement control system shown in FIG. 1.

The configuration of the fine particles space placement control system 1 will be described. FIG. 2 is a block diagram showing the configuration of the fine particles space placement control system shown in FIG. 1.

As shown in FIGS. 1 and 2, the fine particles space placement control system 1 includes a fine particles generator 10, a recognizer 20, an irradiator 30, a diffuser 40, a light source 50, the controller 60, and a frame 90 (see FIG. 1).

The fine particles generator 10 generates fine particles by applying external energy to a liquid or solid. Specifically, the fine particles generator 10 pulverizes water, oil, or inorganic substance by applying energy thereto.

Examples of the energy applied by the fine particles generator 10 include various types of energy, such as ultrasound, electricity and heat. The specific structure of the fine particles generator 10 will be described later.

The recognizer 20 recognizes the form of the fine particles generated by the fine particles generator 10.

The recognizer 20 also recognizes the space area in which the fine particles are staying, using an image sensor (image recognition sensor), such as CMOS. The recognizer 20 is, for example, a USB camera of about 100 thousand to 10 million pixels typically used for image processing or the like.

The irradiator 30 vaporizes or burns and thus removes some of the fine particles generated by the fine particles generator 10 by irradiating the fine particles with an electromagnetic wave. Thus, the fine particles are shaped in the predetermined space.

The electromagnetic wave may be any of infrared light, ultraviolet light, visible light, and the like. The irradiator 30 has a function of shaping the fine particles into a shape desired by the user by vanishing fine particles outside a range desired by the user. The specific structure of the irradiator 30 will be described later.

The diffuser 40 diffuses the fine particles generated by an ultrasonic vibrator 16 to the predetermined space.

For example, the diffuser 40 diffuses the fine particles generated by the ultrasonic vibrator 16 to the predetermined space by sending air to the fine particles. Note that the diffuser 40 may diffuse the fine particles to the predetermined space by sucking air in the predetermined space.

The light source 50 irradiates the fine particles generated by the fine particles generator 10 with visible light. The light source 50 is disposed, for example, on the ceiling. The light source 50 is, for example, a typical lighting fixture.

The light source 50 may irradiate a background imitating a sky. For example, the light source 50 may be a flat panel representing a sky serving as the background of the fine particles forming an artificial cloud.

The light source 50 controls the color tone and the amount of light in accordance with a command outputted from the controller 60 on the basis of form information inputted by the user. As used herein, the term "form information" refers to information indicating the form of fine particles desired by the user.

The light source 50 may be a panel light fixture. The panel light fixture is preferably one whose light amount and light color can be changed so that changes in the sky with time can also be represented.

For example, skies in the morning, daytime, late afternoon, and the like may be represented by lighting LEDs having different light colors.

The light source 50 is preferably a highly water-resistant one considering the resistance against a mist consisting of the fine particles discharged from the fine particles generator 10.

The light source 50 preferably has a communication function so that it is able to communicate with the controller 60.

The controller 60 controls the irradiator 30 by comparing the form of the fine particles recognized by the recognizer 20 and the form information indicating the form of fine particles to be shaped. The controller 60 includes a receiver 61. The receiver 61 receives input of the form information. The specific structure of the controller 60 will be described later.

The frame 90 is a structure that supports the members.

The frame 90 includes the framework of an aluminum frame typically used in an industrial apparatus or the like and a cover made of a metal or resin.

The color of a portion visually recognized by the user of the frame 90 is preferably an inconspicuous color such as white so that the color does not affect the appearance of a pseudo-sky imitated by the fine particles forming the artificial cloud.

(2-1) Configuration of Fine Particles Generator 10

Figure 3:
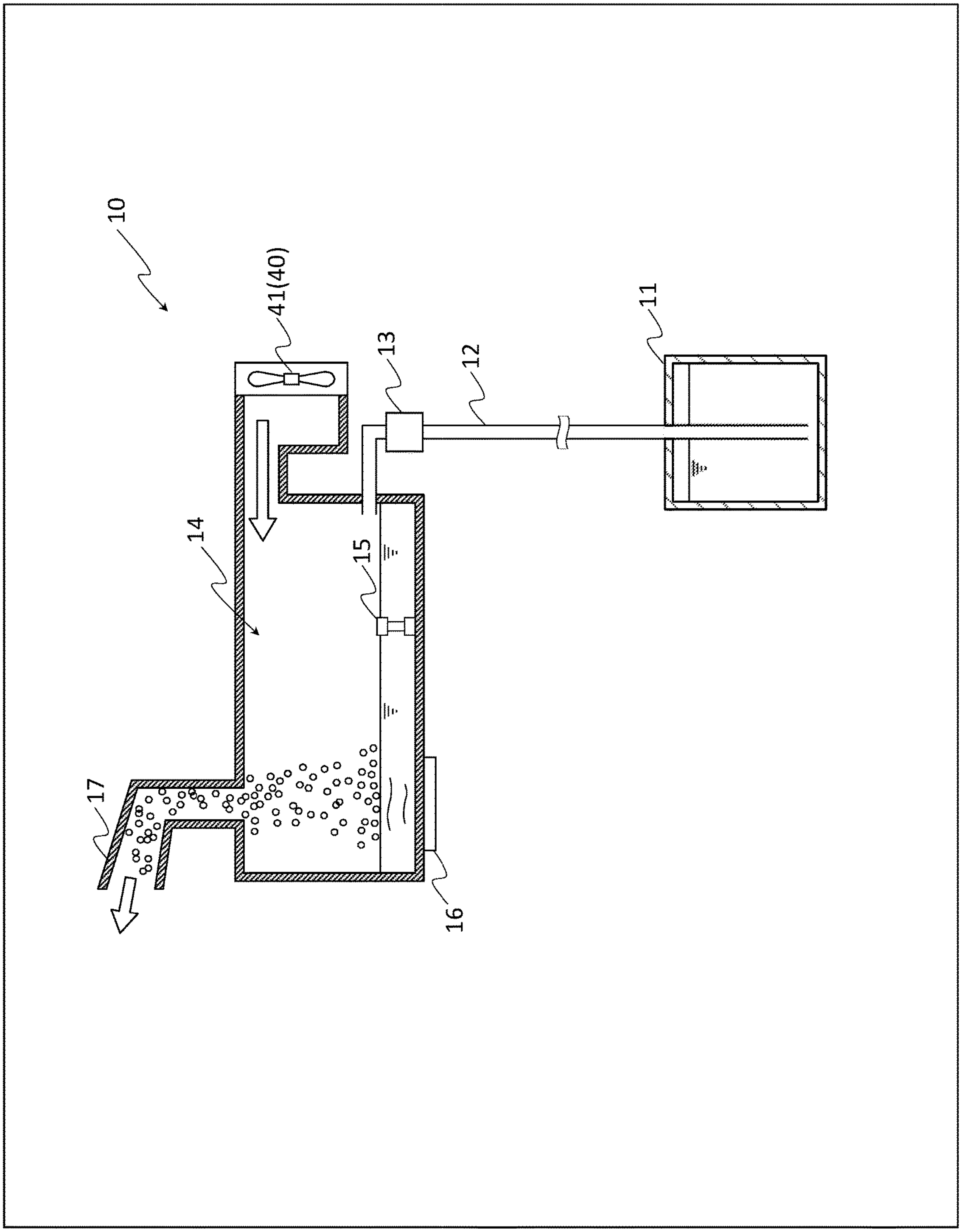
FIG. 3 is a sectional view showing the structure of a fine particles generator.

The configuration of the fine particles generator 10 will be described. FIG. 3 is a sectional view showing the structure of the fine particles generator 10.

As shown in FIG. 3, the fine particles generator 10 includes a storage tank 11, a supply tube 12, a supply pump 13, an atomization chamber 14, a float switch 15, the ultrasonic vibrator 16, and a nozzle 17. In the following description, it is assumed that fine particles form a mist.

The storage tank 11 is storing a liquid (tap water, etc.) serving as the raw material of a mist consisting of fine particles. The material of the storage tank 11 is preferably a resin material that is cheap and lightweight and does not easily corrode, such as polyethylene or polypropylene. The capacity of the storage tank 11 is preferably about 10 to 30 L so that a large amount of mist can be generated with one liquid supply.

Examples of the liquid stored in the storage tank 11 include water, as well as disinfectant hypochlorite water and aroma component-containing water.

The supply tube 12 is inserted in the storage tank 11.

The supply tube 12 connects the inside of the storage tank 11 and the inside of the atomization chamber 14. The supply tube 12 pulls up the liquid from the storage tank 11 to the atomization chamber 14. The material of the supply tube 12 is preferably a water-resistant resin material (polyurethane, PVC, fluororesin, etc.).

The supply tube 12 is preferably transparent so that bubbles or the like therein can be visually recognized. The supply tube 12 preferably has an inner diameter of about 6 to 20 mm so that it is easily routed.

The supply pump 13 is disposed on a middle portion of the supply tube 12.

The supply pump 13 serves as the source of a suction force by which the liquid stored in the storage tank 11 is transferred to the atomization chamber 14. The supply pump 13 is, for example, a diaphragm pump typically used in pumped storage or the like.

The supply pump 13 supplies the liquid stored in the storage tank 11 into the atomization chamber 14 on the basis of a command from the controller 60. The amount of liquid in the atomization chamber 14 is detected by the float switch 15.

The atomization chamber 14 consists of a casing containing a rectangular-parallelepiped space. The atomization chamber 14 is storing the liquid supplied from the storage tank 11.

A stay space in which a gas obtained by atomizing the liquid is hanging is formed in the atomization chamber 14. The material of the casing forming the atomization chamber 14 is preferably a corrosion-resistant metal (aluminum, stainless), or the like.

The float switch 15 is disposed in the atomization chamber 14. When the float of the float switch 15 moves up or down with a change in the liquid level in the atomization chamber 14, the float switch 15 detects the changed liquid level.

The float switch 15 detects that an appropriate level has been reached so that the liquid level in the atomization chamber 14 does not become an excessive level, and transmits a signal to the controller 60. The controller 60 outputs a supply-OFF signal to the supply pump 13 in accordance with the signal received from the float switch 15. The float switch 15 is, for example, one used in a typical humidifier or the like.

The ultrasonic vibrator 16 is disposed on the bottom of the casing forming the atomization chamber 14. The ultrasonic vibrator 16 generates fine particles by pulverizing the liquid using ultrasonic vibration.

Specifically, the ultrasonic vibrator 16 pulverizes and atomizes the liquid stored over the bottom of the atomization chamber 14 by vibrating the liquid.

The ultrasonic vibrator 16 is, for example, a piezoelectric device having a frequency of about 1 to 5 MHz.

For example, if a piezoelectric device having a frequency of 1.6 MHz or 2.4 MHz is used, a mist having a particle diameter of about 4 μm or 3 μm, respectively, is generated. As the particle diameter is smaller, a thick (easy-to-visually-recognize) mist is generated with a smaller liquid amount. For this reason, it is preferred to use a piezoelectric device having a high frequency. The amount of atomization is preferably 1 to 30 L/h. The atomized water is hanging in the stay space in the atomization chamber 14.

The nozzle 17 is disposed on a part of the casing forming the atomization chamber 14 and forms an opening that connects the inside and outside of the atomization chamber 14. In the shown example, the base of the nozzle 17 is connected to the upper surface of the casing.

The nozzle 17 discharges the mist staying in the atomization chamber 14 toward a predetermined space through the discharge port of the tip thereof. To represent a mist slowly hanging in the predetermined space, it is preferable that the discharge speed be slow and the discharge range be wide. For this reason, the nozzle 17 is preferably shaped such that the inner diameter is gradually increased from the base toward the tip.

Since fine particles tend to move in the direction of gravity, the discharge direction of the nozzle 17 is preferably an obliquely upward direction. The material of the nozzle 17 is preferably an easy-to-shape, water-resistant resin (polypropylene, polyethylene, etc.).

The discharge port of the nozzle 17 may be covered by a porous filter. Thus, fine particles having a constant particle size and a high concentration are generated.

An air sending fan 41 serving as the diffuser 40 is connected to the fine particles generator 10. The air sending fan 41 is disposed in a position opposite to the nozzle 17 of the casing forming the atomization chamber 14.

The casing is structured such that air from the air sending fan 41 flows into the staying space in the atomization chamber 14.

Thus, air sent from the air sending fan 41 becomes an airflow that sends the mist generated by the ultrasonic vibrator 16 toward the nozzle 17. This airflow sends the mist hanging in the staying space toward the nozzle 17 and is discharged from the casing along with the mist through the nozzle 17.

The air sending fan 41 is preferably one that is turned on and off and whose flow rate is controlled so that the amount of a mist discharged from the nozzle 17 can be controlled.

The fan is used in an environment that is filled with a mist and therefore is preferably a highly moisture-resistant fan. The air sending fan 41 sends air on the basis of a command from the controller 60.

(2-2) Configuration of Irradiator 30

Figure 4:
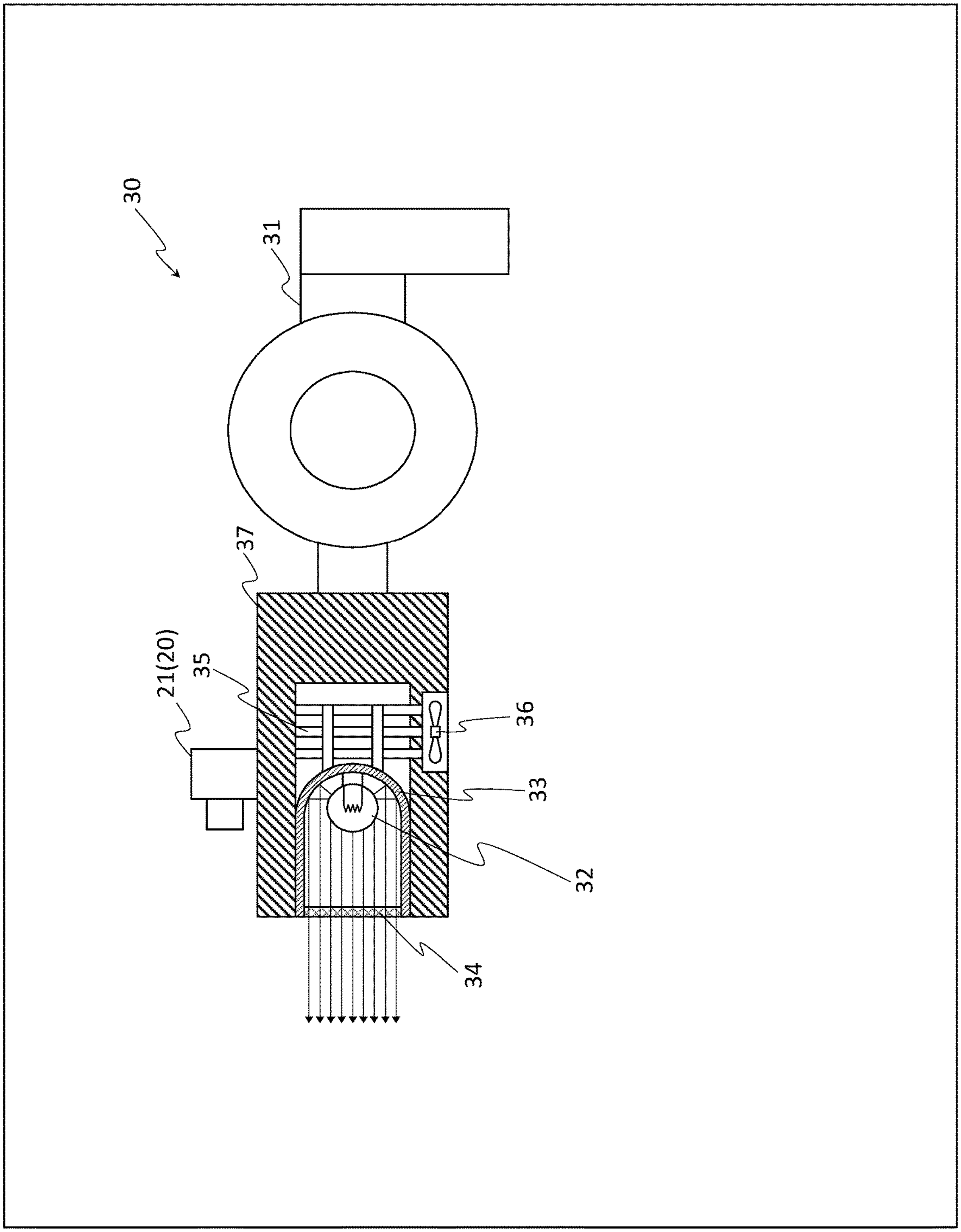
FIG. 4 is a partial sectional view showing the structure of an irradiator.

The configuration of the irradiator 30 will be described. FIG. 4 is a sectional view showing the structure of the irradiator 30.

As shown in FIG. 4, the irradiator 30 includes an actuator 31 (actuator), an infrared heater 32, a reflection plate 33, a visible light cut filter 34, a heat sink 35, a cooling fan 36, and a housing 37.

The irradiator 30 is formed integrally with the recognizer 20.

The actuator 31 is actuated under the control of the controller 60. The actuator 31 is movement means for orienting the recognizer 20 and irradiator 30 formed integrally with each other to the optimum position. The actuator 31 is, for example, a pan/tilt mechanism used in a monitoring camera or the like, which is a small actuator capable of controlling a mounted object in any direction.

The infrared heater 32 is an infrared irradiation source and vaporizes or burns and thus vanishes fine particles by heating them in a non-contact manner That is, in the shown example, the irradiator 30 irradiates fine particles with infrared light as an electromagnetic wave.

The infrared heater 32 is preferably a carbon fiber heater, which is a heater that quickly starts up irradiation and is able to generate light having a wavelength of around 3 μm, which is easily absorbed by a mist consisting of fine particles.

The output of the infrared heater 32 is preferably about 500 to 5000 W.

The reflection plate 33 reflects the infrared light radiated from the infrared heater 32 so that the infrared light is radiated as parallel light. The reflection plate 33 is, for example, a reflection plate 33 used in a parallel far-infrared line heater or the like. The material of the reflection plate 33 is preferably a mirror-polished metal (aluminum, stainless, or the like).

To reduce the radiation of visible light components, the inside of the reflection plate 33 may be coated with an infrared reflection film, which absorbs visible light. As a coating material having high infrared reflectivity and visible light absorbency used as such an infrared reflection film, a black pigment including a compound of a metal such as Si, Al, Zr, or Ti as an ingredient may be selected.

The visible light cut filter 34 is a filter that transmits only invisible infrared light. The visible light cut filter 34 does not transmit visible light such as red light among the types of light radiated by the infrared heater 32 and thus prevents the visible light from affecting the appearance of a pseudo-sky imitated by an artificial cloud.

The visible light cut filter 34 is, for example, colored glass that transmits infrared light and absorbs visible light.

The heat sink 35 is a member that dissipates the residual heat of the infrared heater 32. The heat sink 35 is preferably a metal having good thermal conductivity (aluminum, copper, or the like) typically used as a heat dissipation member.

The cooling fan 36 dissipates the heat absorbed by the heat sink 35 into air.

The cooling fan 36 is, for example, a typical DC fan having a size of about 10 to 100 mm square.

The housing 37 is a member serving as the casing of the irradiator 30.

The housing 37 has a function of insulating the heat of the infrared heater 32 so that the heat is not transmitted to the recognizer 20 or actuator 31. The material of the housing 37 is preferably a heat-resistant resin (polyimide, PPS, PSU).

Next, the operation principles of the irradiator 30 will be described.

Infrared light radiated from the infrared heater 32 of the irradiator 30 is reflected by the reflection plate 33 and applied to fine particles as parallel light.

At this time, visible light components are cut by the visible light cut filter 34 disposed in front in the irradiation direction of the infrared heater 32, and only invisible infrared light is applied to the fine particles.

The residual heat of the infrared heater 32 is absorbed by the heat sink 35 and is dissipated to the outside by the cooling fan 36.

Since the irradiator 30 is covered by the heat insulating housing 37, heat transfer to the surrounding members is suppressed. Although not shown, an excessive temperature rise detection sensor such as a thermostat may be disposed on the irradiator 30 as an anti-heating measure so that the infrared heater 32 is powered off when the temperature is increased to a threshold or higher.

Multiple irradiators 30 may be disposed. In this case, the irradiators 30 may be disposed in positions opposite to each other with respect to the predetermined space, in which the fine particles generator 10 generates fine particles. As used herein, the term "opposite positions" refers to positions opposite to each other with respect to the central portion of the predetermined space.

(2-3) Configuration of Controller 60

Figure 5:
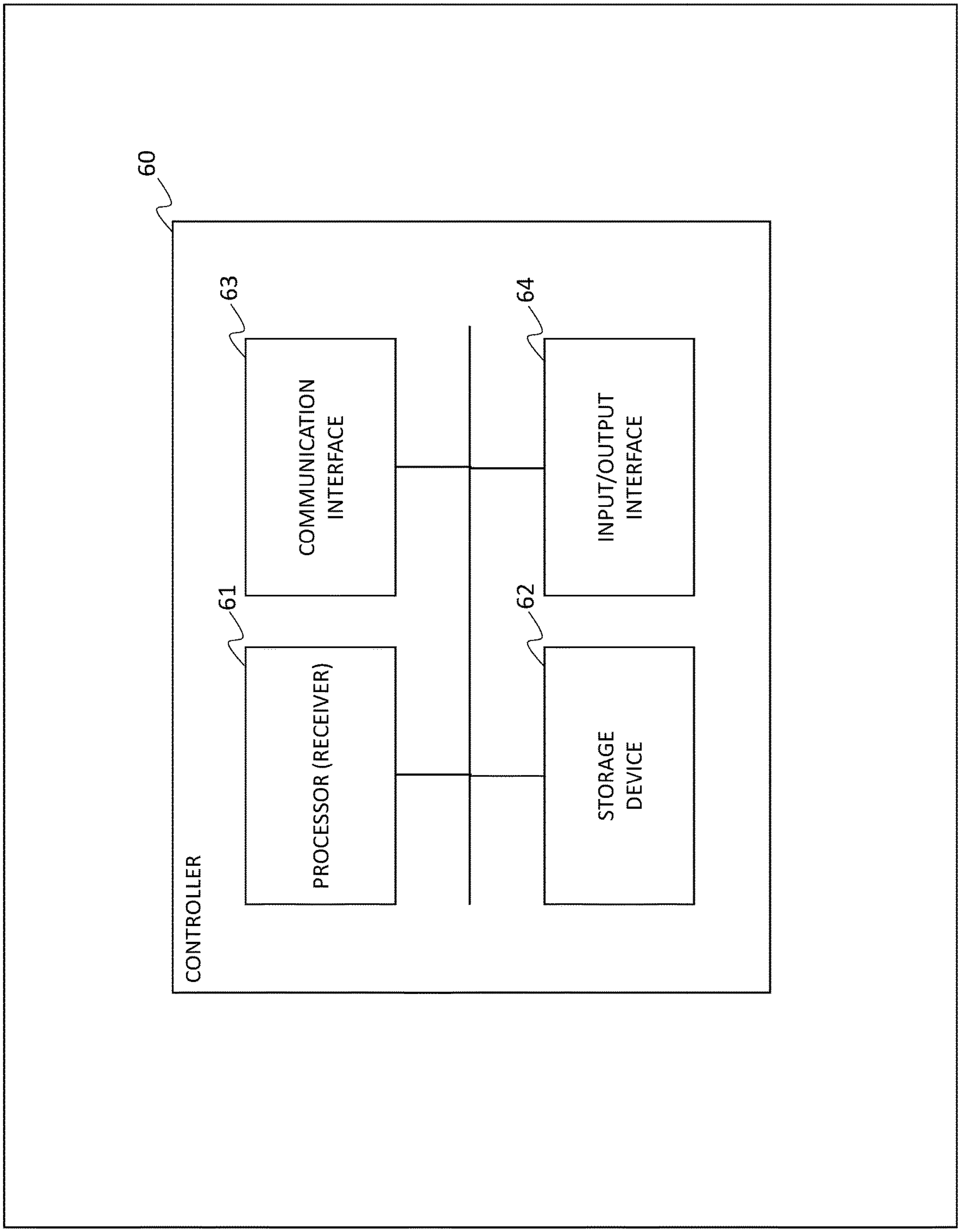
FIG. 5 is a block diagram showing the configuration of a controller.

The configuration of the controller 60 will be described. FIG. 5 is a block diagram showing the configuration of the controller 60.

As shown in FIG. 5, the controller 60 includes a processor 61, a storage device 62, a communication interface 63, and an input/output interface 64.

The processor 61 is configured to implement the functions of the controller 60 by starting a program stored in the storage device 62. The processor 61 is, for example, a computer. Examples of the functions of the processor 61 include the following:

- a function of causing the fine particles generator 10 to generate fine particles; and
- a function of causing the irradiator 30 to irradiate fine particles.

The processor 61 analyzes the following information received from the operation terminal 70 and recognizer 20:

- the form of fine particles to be shaped;
- the form of the fine particles hanging in the predetermined space; and
- the range of the fine particles hanging in the predetermined space to be irradiated by the irradiator 30.

The processor 61 identifies the form of fine particles to be shaped, from the form information inputted by the user through the operation terminal 70. That is, the processor 61 serves as the receiver 61 that receives input of the form information.

The processor 61 urges the user to select, as form information, at least one of the attributes of a cloud, that is, at least one of the shape of the cloud and the period condition, time condition, and area condition under which the cloud occurs and to input the selected form information to the processor 61. The shape of the cloud is a name representing the type of the cloud, such as cirrus, cirrocumulus, cumulonimbus, or altostratus.

The term "period condition, time condition, and area condition under which the cloud occurs" refers to indexes identifying the shape of a cloud that particularly tends to occur in a particular area in a particular time zone of a particular period, from these occurrence environments.

The processor 61 analyzes the shape of the fine particles acquired by the image recognition sensor forming the recognizer 20 and grasps the form of the current fine particles hanging in the predetermined space at the present time point.

Then, by comparing the form of fine particles indicated by the form information and the form of the current fine particles, the processor 61 identifies the range of the fine particles hanging in the predetermined space to be irradiated by the irradiator 30.

The processor 61 then generates an actuation signal to be inputted to the actuator 31 and an irradiation signal to be inputted to the irradiator 30. The actuation signal is a signal indicating the amount of actuation of the actuator 31. The irradiation signal is a signal indicating the range, strength, and time of irradiation of the irradiator 30.

The storage device 62 is configured to store programs and data. The storage device 62 is, for example, a combination of a read-only memory (ROM), a random access memory (RAM), and a storage (for example, flash memory or hard disk).

Examples of the programs include the following:

- an operating system (OS) program; and
- application programs (e.g., Web browser) that perform information processing.

Examples of the data include the following:

- information on the attributes of a cloud to be presented to the user so that the user selects among the attributes;
- the form information inputted by the user; and
- information on the form of the current fine particles recognized by the recognizer 20.

The input/output interface 64 is configured to acquire a command of the user from an input device connected to the controller 60 and to output information to an output device connected to the controller 60.

The input device is, for example, a keyboard, a pointing device, a touchscreen, or a combination thereof. The output device is, for example, a display.

The communication interface 63 is configured to control the communication between the controller 60 and the external devices.

The external devices are the fine particles generator 10, irradiator 30, recognizer 20, diffuser 40, light source 50, and operation terminal 70.

(3) Control Process

A control process of the present embodiment will be described.

Figure 6:
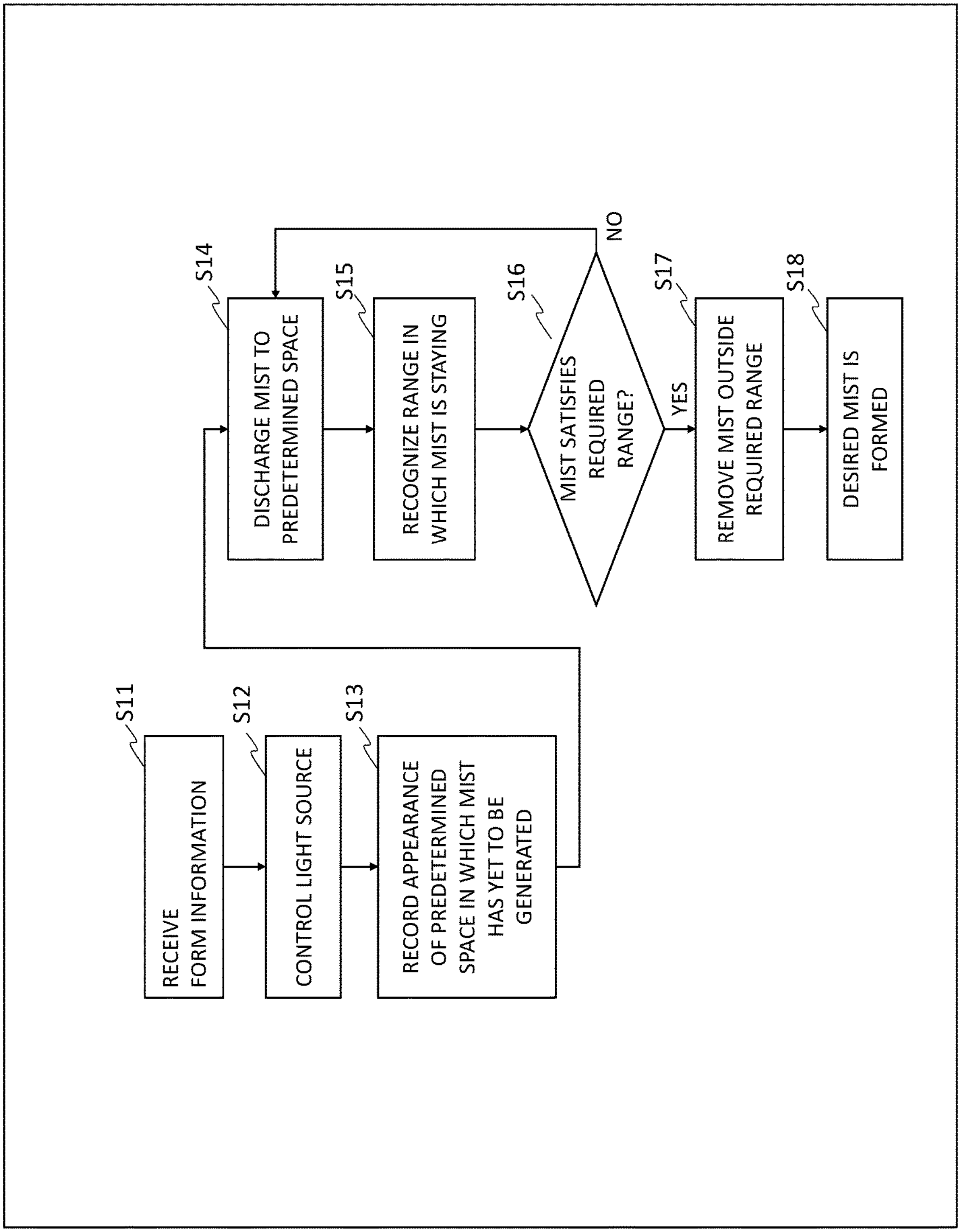
FIG. 6 is a diagram showing a control process performed by the fine particles space placement control system.

FIG. 6 is a flowchart of the control process of the present embodiment. In the description of the control process, it is assumed that a liquid serving as a raw material is water and fine particles form a mist.

As shown in FIG. 6, the processor 61 receives input of form information from a user (S11).

Specifically, the processor 61 urges the user to select, as form information, at least one of the attributes of a cloud, that is, at least one of the shape of the cloud and the period condition, time condition, and area condition under which the cloud occurs and to input the selected form information to the receiver 61. The user inputs such information through the operation terminal 70.

After step S11, the processor 61 controls the light source 50 (S12).

Specifically, the controller 60 transmits a command to control the color tone and the amount of light, to the light source 50 on the basis of the form information inputted by the user.

After step S12, the processor 61 records the appearance of a predetermined space in which a mist has yet to be generated (S13).

Specifically, the controller 60 controls the recognizer 20 and irradiator 30 to record the appearance of the predetermined space in the initial state while moving the actuator 31 so that the recognizer 20 can capture an image of the entire predetermined space.

After step S13, the processor 61 discharges a mist into the predetermined space (S14).

Specifically, the controller 60 controls the fine particles generator 10 to discharge the mist while controlling the flow rate so that the desired mist generation range obtained from the form information is covered.

At this time, the fine particles generator 10 generates the mist consisting of fine particles by applying external energy to the liquid and discharges the mist to the predetermined space.

After step S14, the processor 61 recognizes the range in which the mist is staying (S15).

Specifically, the controller 60 controls the recognizer 20 and irradiator 30 to record an image of the generated mist while moving the actuator 31. The controller 60 then recognizes the range in which the mist is staying by comparing the image of the mist and the initial state.

After step S15, the processor 61 determines whether the mist satisfies the required range (S16).

Specifically, the controller 60 compares the range in which the mist is staying and the form information.

If the mist does not satisfy the required range in step S16 (NO in S16), the processor 61 returns to step S14.

Specifically, if the area required by the form information is not filled with the mist, the processor 61 returns to step S14 and continuously discharges the mist.

If the mist satisfies the requirement range in step S16 (YES in S16), the processor 61 removes the mist outside the required range (S17).

Specifically, if the mist satisfies the requirement range, the processor 61 grasps the position of the mist staying outside the required range from the difference between the range in which the mist is staying and the form information.

Then, while actuating the actuator 31 to control the position of the irradiator 30, the controller 60 causes the irradiator 30 to vanish the mist staying outside the required range by irradiating such a mist with infrared light.

Through these steps, the mist is shaped into the form desired by the user in the predetermined space (S18). By repeating the series of steps, the mist having the form according to the form information is maintained.

As described above, according to the present embodiment, the fine particles generator 10 generates fine particles. Thus, fine particles are continuously supplied to the predetermined space.

The irradiator 30 shapes the fine particles generated by the fine particles generator 10 by irradiating and removing some of the fine particles with an electromagnetic wave.

Thus, even if the fine particles generator 10 continuously supplies fine particles and thus the range of fine particles is excessively widened, the irradiator 30 is able to remove fine particles located in an unwanted area. Thus, a situation is created in which fine particles are always staying in the desired range of the predetermined space. That is, fine particles are retained in the predetermined space area.

By generating an artificial cloud consisting of fine particles as described above, a cloud-floating sky is faithfully reproduced and people can obtain a feeling of release like that when viewing such a sky outdoors. "The cloud whose form varies with time but that is staying in the predetermined space area as a whole" is directly generated indoors rather than in a partitioned closed space, and a state closer to that outdoors is reproduced.

For example, even in an environment in which going outdoors is restricted, such as a hospital room, a person is able to obtain a feeling of release as if the person were present outdoors by generating an artificial cloud indoors using the fine particles space placement control system 1.

By generating the fine particles consisting of droplets rather than generating images or light, as described above, the sense of touch can be stimulated by the flow or the like of the fine particles. A substance that stimulates the sense of smell or the sense of taste or a substance that sounds when volatilized may be included in the raw material of the particles.

For example, a sky on the seaside can be reproduced using aroma components close to those of the aroma of the seaside. By appealing to the five senses, parasympathetic nerve activation, healing effect, awakening effect, or the like is expected to be obtained.

Study on 1/f fluctuations and the like has revealed that patterns including irregular changes among simple changes are present in the nature and such patterns give a healing effect to humans.

It has been also revealed that a cloud in the nature also moves in accordance with a signal close to 1/f fluctuations. While the artificial cloud consisting of the fine particles generated in the present invention is also monotonous in that it is staying in the specific range, it can produce a similar healing effect due to inclusion of irregular flows therein.

The irradiator 30 irradiates some of the fine particles with infrared light as an electromagnetic wave. For this reason, a general-purpose infrared irradiator, which is relatively easily obtained, may be used as the irradiator 30. Thus, an irradiator 30 having a simple configuration is formed.

The fine particles generator 10 includes the ultrasonic vibrator 16 that generates fine particles by pulverizing a liquid using ultrasonic vibration.

Thus, the fine particles generator 10 is able to generate fine particles with less energy than a configuration that pulverizes a solid.

The diffuser 40 diffuses the fine particles generated by the ultrasonic vibrator 16 to the predetermined space. Since it promotes the diffusion of the fine particles to the predetermined space, the fine particles are efficiently retained in the predetermined space.

The air sending fan 41 serving as the diffuser 40 diffuses the fine particles generated by the ultrasonic vibrator 16 to the predetermined space by sending air to the fine particles. Specifically, an airflow generated from the air sent by the air sending fan 41 efficiently carries the fine particles to the predetermined space.

The recognizer 20 recognizes the form of the fine particles generated by the fine particles generator 10. The controller 60 controls the irradiator 30 by comparing the form of the fine particles recognized by the recognizer 20 and the form information indicating the form of fine particles to be shaped. Thus, the irradiator 30 is able to shape the fine particles into the form desired by the user.

The controller 60 includes the receiver 61 that receives input of the form information. The controller 60 urges the user to select, as form information, at least one of the attributes of a cloud, that is, at least one of the shape of the cloud and the period condition, time condition, and area condition under which the cloud occurs and to input the selected form information to the receiver 61.

As seen above, the user is able to easily input a desired form by selecting among the attributes of the cloud proposed by the controller 60.

The actuator 31 is actuated under the control of the controller 60.

Thus, the actuator 31 is able to change the position of the irradiator 30 and to give the degree of freedom to the irradiation aspect of the irradiator 30 so that fine particles in various forms can be generated.

The irradiator 30 is formed integrally with the recognizer 20. For this reason, the position relationship between the recognizer 20 and fine particles is made close to the position relationship between the irradiator 30 and fine particles.

This reduces the load of controlling the irradiator 30 on the basis of information on the form of the current fine particles acquired from the recognizer 20.

Multiple irradiators 30 may be disposed such that the irradiators 30 are located in positions opposite to each other with respect to the predetermined space.

In this case, the irradiators 30 are able to irradiate the fine particles with infrared light from the positions opposite to each other and thus to efficiently shape the fine particles.

The light source 50 irradiates the fine particles generated by the fine particles generator 10 with visible light. Thus, the fine particles disperse the visible light and produce visual effects close to those of a cloud in the nature.

The light source 50 may irradiate a background imitating a sky. In this case, the fine particles hanging indoors can imitate a cloud floating in a blue sky and can produce better visual effects.

(4) Modifications

Modifications of the present embodiment will be described.

(4-1) Modification 1

Figure 7:
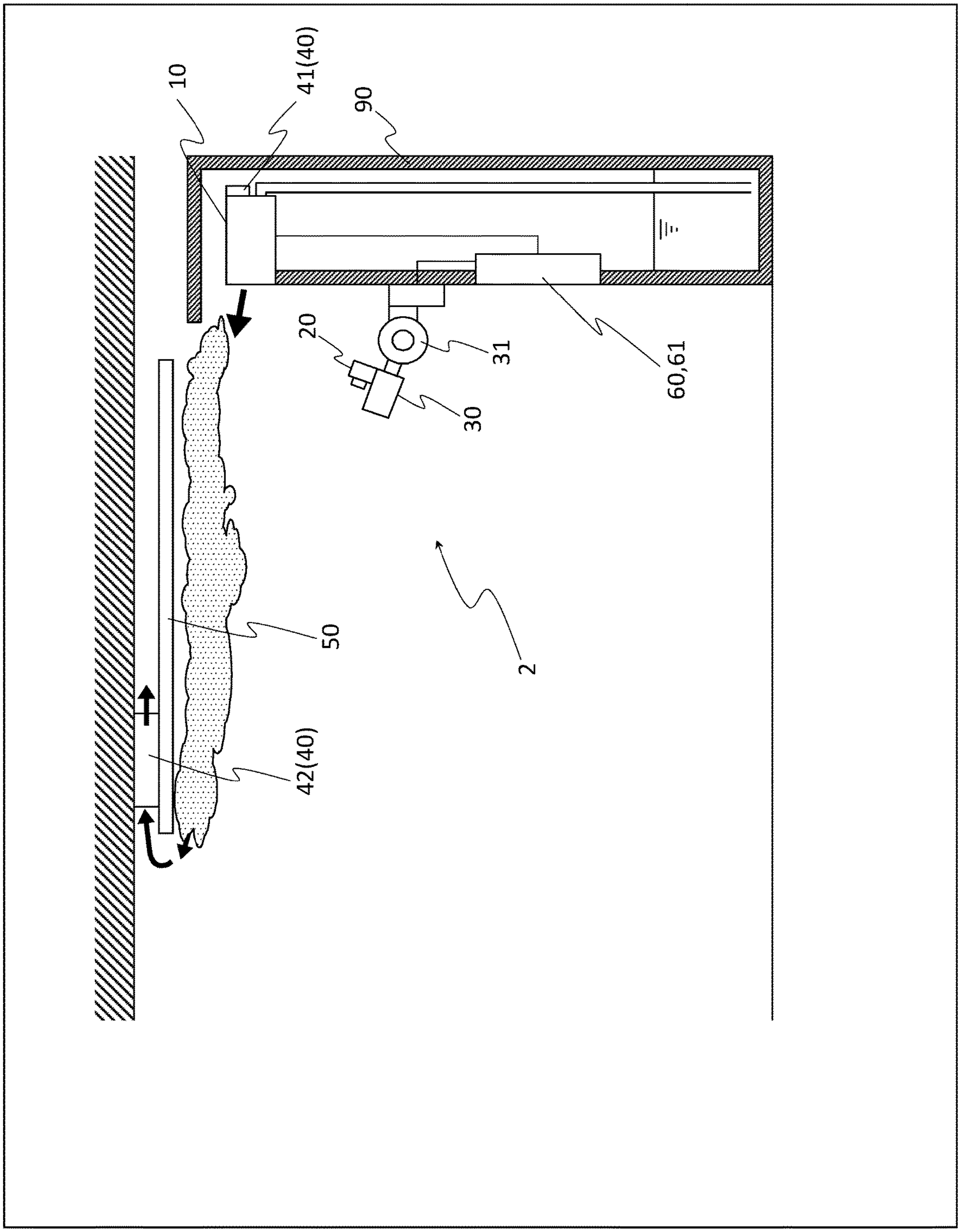
FIG. 7 is an external view of a fine particles space placement control system according to a modification 1.

A modification 1 will be described. The modification 1 is an example in which a suction unit 42 that sucks fine particles forms a part of a diffuser 40. FIG. 7 is an external view of a fine particles space placement control system 2 according to the modification 1.

As shown in FIG. 7, the fine particles space placement control system 2 includes a fine particles generator 10, a recognizer 20, an irradiator 30, the diffuser 40, a light source 50, and a controller 60. Among these elements, those except for the diffuser 40 are the same as those of the first embodiment and therefore will not be described.

The diffuser 40 of the fine particles space placement control system 2 includes the suction unit 42 in addition to an air sending fan 41 described above.

The diffuser 42 diffuses fine particles to a predetermined space by sucking air in the predetermined space.

In the shown example, the suction unit 42 is disposed in a position opposite to the air sending fan 41 with respect to the predetermined space. The suction unit 42 is disposed between the ceiling and the light source 50.

When the suction unit 42 sucks air in the predetermined space, the fine particles hanging in the predetermined space are sucked by the suction unit 42 and thus diffused in the predetermined space. For example, the suction unit 42 may be formed by routing a duct or the like from an existing exhaust facility.

As described above, in the fine particles space placement control system 2 according to the modification 1, the suction unit 42 forming a part of the diffuser 40 sucks air in the predetermined space and thus diffuses the fine particles in the predetermined space.

By disposing the suction unit 42 in a location distant from the air sending fan 41, the fine particles are diffused throughout the predetermined space.

Since the suction unit 42 is disposed between the ceiling and the light source 50, the fine particles flow in an obliquely upward direction. Thus, even if the fine particles are gently discharged from the nozzle 17 of the fine particles generator 10, the fine particles are easily spread in the direction of discharge from the nozzle 17 while the drop thereof is suppressed.

(4-2) Modification 2

Figure 8:
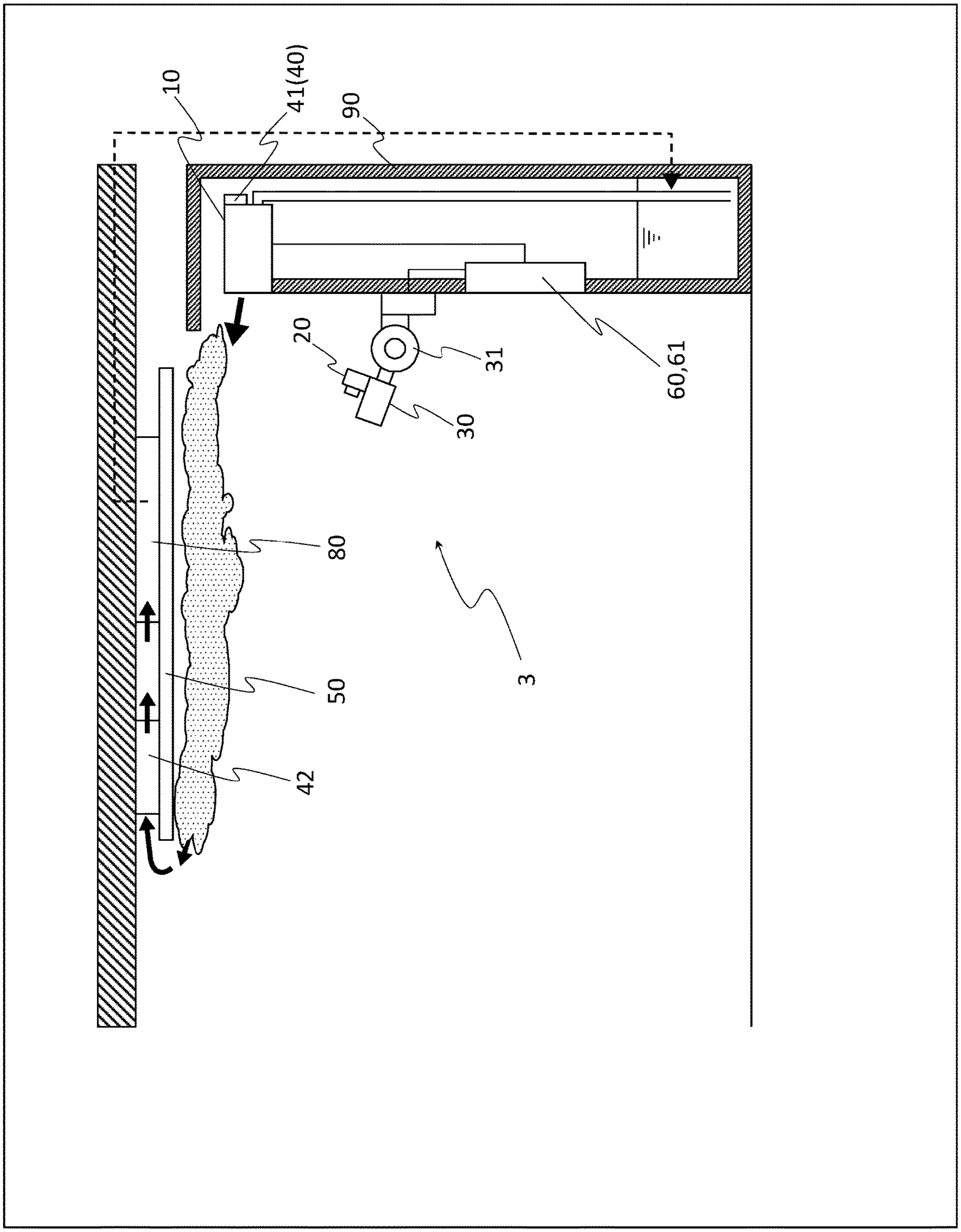
FIG. 8 is an external view of a fine particles space placement control system according to a modification 2.

A modification 2 will be described. The modification 2 is an example in which a dehumidifying function is provided. FIG. 8 is an external view of a fine particles space placement control system 3 according to the modification 2.

As shown in FIG. 8, the fine particles space placement control system 3 includes a fine particles generator 10, a recognizer 20, an irradiator 30, a diffuser 40, a light source 50, a controller 60, and a dehumidifier 80. Among these elements, those except for the dehumidifier 80 are the same as those of the modification 1 and therefore will not be described.

The dehumidifier 80 dehumidifies a predetermined space by sucking a mist consisting of fine particles hanging in the predetermined space or air heated by infrared irradiation. The dehumidifier 80 may be used in combination with a suction unit 42 as shown in FIG. 8, or may be used alone. Water recovered by the dehumidifier 80 may be returned to a storage tank 11.

To reproduce an air environment desired by a user, the dehumidifier 80 may cooperate with an air-conditioning facility, such as a cooler or heater. In this case, a user additionally inputs, as data, a condition on the temperature or humidity to the controller 60. Thus, the fine particles space placement control system 3 serves as a system having an air conditioning function.

As seen above, the fine particles space placement control system 3 according to the modification 2 has the dehumidification function and thus is able to control indoor humidity and to control the air environment in accordance with a user requirement. Also, the fine particles space placement control system 3 is able to suppress the amount of consumed water by returning water recovered by the dehumidifier 80 to the storage tank 11.

(4-3) Modification 3

Figure 9:
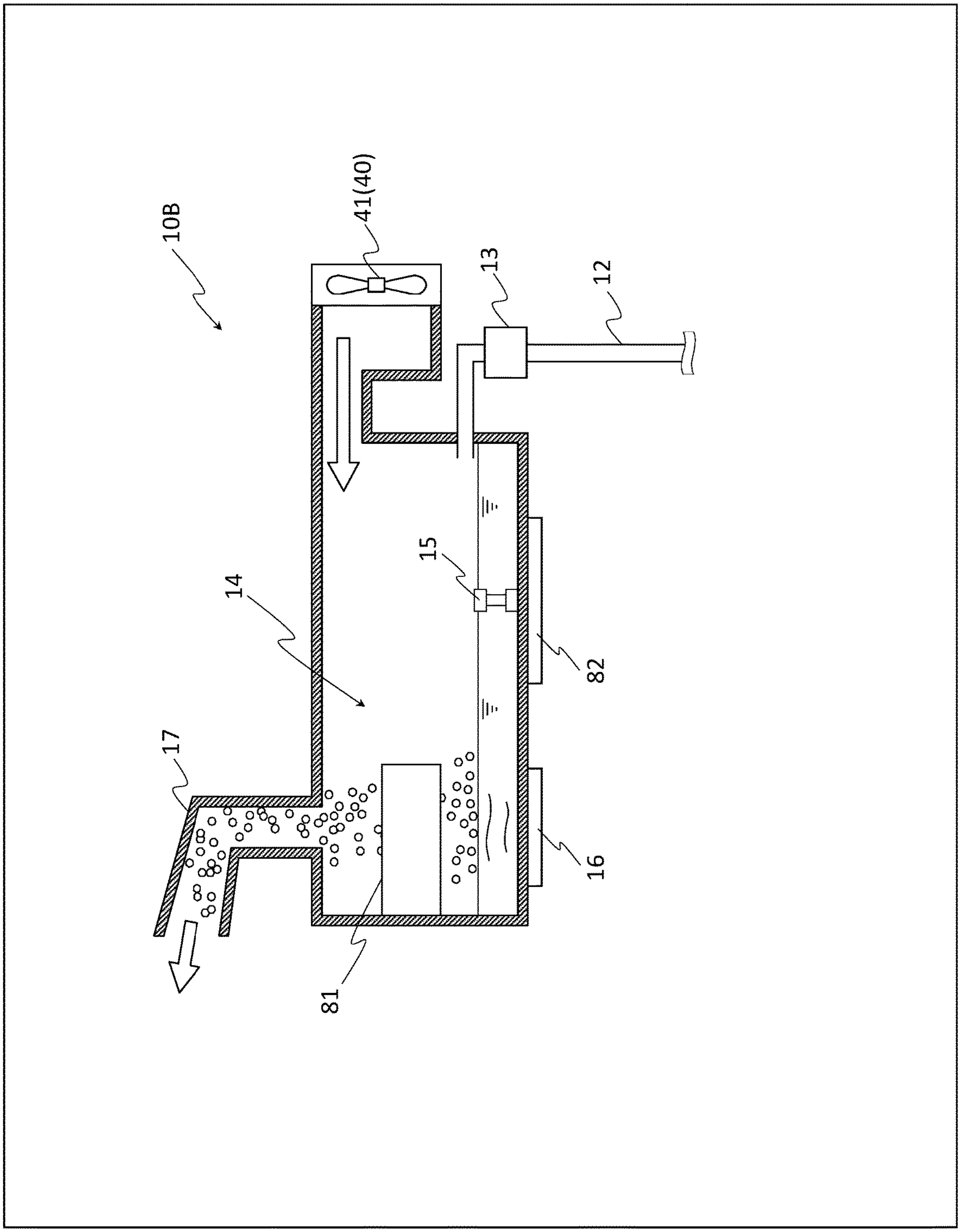
FIG. 9 is a sectional view showing the structure of a fine particles generator according to a modification 3.

A modification 3 will be described. The modification 3 is an example in which a fine particles generator 10B includes a UV germicidal lamp 81 (ultraviolet irradiator), and a temperature control mechanism 82. FIG. 9 is a sectional view showing the configuration of the fine particles generator 10B according to the modification 3.

The fine particles generator 10B includes a storage tank 11, a supply tube 12, a supply pump 13, an atomization chamber 14, a float switch 15, an ultrasonic vibrator 16, a nozzle 17, the UV germicidal lamp 81, and the temperature control mechanism 82. Among these elements, those except for the UV germicidal lamp 81 and temperature control mechanism 82 are the same as those of the first embodiment and therefore will not be described.

The UV germicidal lamp 81 disinfects at least one of fine particles generated in a casing (a mist in this example) and the raw material of the fine particles (water in this example) by irradiating the fine particles or the like with ultraviolet light. The UV germicidal lamp 81 is disposed in a position between the ultrasonic vibrator 16 and nozzle 17 in the casing.

The UV germicidal lamp 81 thus configured is able to suppress the growth of microorganisms inside the generated fine particles.

The temperature control mechanism 82 is disposed on the bottom of the casing. The temperature control mechanism 82 is, for example, a Peltier temperature control mechanism. The temperature control mechanism 82 controls the temperature of at least one of water serving as a raw material and fine particles (mist) generated from the raw material.

For example, by cooling the fine particles using the temperature control mechanism 82, the influence on the outside air temperature of an increase in the temperature of the fine particles due to infrared irradiation of the irradiator 30 is cancelled out.

Also, by cooling the fine particles using the temperature control mechanism 82, a problem is avoided that the fine particles are easily lost under high-outside air temperature and low-humidity conditions.

By adding a temperature/humidity sensor to a part of the fine particles space placement control system 1 or causing a part of the fine particles space placement control system 1 to receive temperature/humidity measurement data from an external device, the temperature of the mist may be controlled in accordance with the environment.

(5) Other Modifications

A ceiling designed so as to have an appearance close to a sky may be used. Also, an image of a blue sky or the like may be displayed on a large display so that the image is used as the background.

As a method for imitating a night sky, a technology that projects an image of a starry sky or the like onto the ceiling or wall using a projector may be employed. A cloud may be generated in front of an image projected on the ceiling as the background.

To represent a variety of skies, lighting fixtures or structures imitating a rainbow, sun, moon, and the like may be added. For example, when generating a rainbow, while light having a wide wavelength is emitted from a xenon lamp at an angle of 40 to 42° from the eye line of a user in accordance with conditions under which a rainbow occurs in the nature. This allows the user to visually recognize a rainbow.

An additional effect may be produced by adding an active ingredient to the liquid serving as the raw material of fine particles. For example, a mist having bactericidal and deodorizing effects is generated by using hypochlorite water as a raw material.

The aroma components of essential oil or the like, or components that stimulate both of the sense of taste and the sense of smell, such as liquids used in electronic cigarettes and the like, may be used as a raw material.

A mist having functionality may be generated by using a liquid containing nanobubbles or microbubbles, or non-toxic microorganisms as a raw material. For example, a technology is known that generates a continuously disinfectant mist by using a liquid containing ozone nanobubbles.

Also, it is expected that a mist having $CO_2$ absorption performance or air cleaning performance will be generated by using a liquid containing microorganisms having photosynthetic ability, such as algae.

A technology may be used that generates a mist by simultaneously injecting water and pressurized air from a nozzle rather than pulverizing a liquid using ultrasonic vibration.

Also, a technology may be used that generates a great amount of a mist by heating a liquid (a mixture of ethylene glycol and water, etc.) supplied from a tank and discharging the liquid while cooling it.

Also, droplets formed from water vapor in air using dry ice or the like may be used as a mist.

Instead of infrared irradiation from the irradiator 30, thermal radiation from a transparent film heater or a resin obtained by mixing far-infrared emissions, such as carbon nanotube and silica, may be used.

By disposing a thermal radiator in a wire frame shape in a space area in which a user wants to generate an artificial cloud and discharging a mist into the wire frame structure, the mist is accumulated only in an area located inside the frame.

A suction port may be formed in a position of the wire frame structure through which a user wants to remove the mist, so that the mist is removed by suction. Instead of suction, the mist may be removed by releasing dry air only to the periphery of the frame.

Also, a technology may be used that removes particles by applying a high voltage to an electrode to cause a flow of charged particles. Particles charged by applying a voltage to a wire frame structure may be removed.

The structure of the actuator 31 for moving the recognizer 20 and irradiator 30 may be a robot hand or a linear axis/theta axis motor control mechanism rather than the pan/tilt actuator. A predetermined position may be recognized and irradiated by arranging image recognition sensors and infrared irradiators in an array and actuating an image recognition sensor and infrared irradiator located in corresponding positions rather than moving the recognizer 20 and irradiator 30.

Second Embodiment

Figure 10:
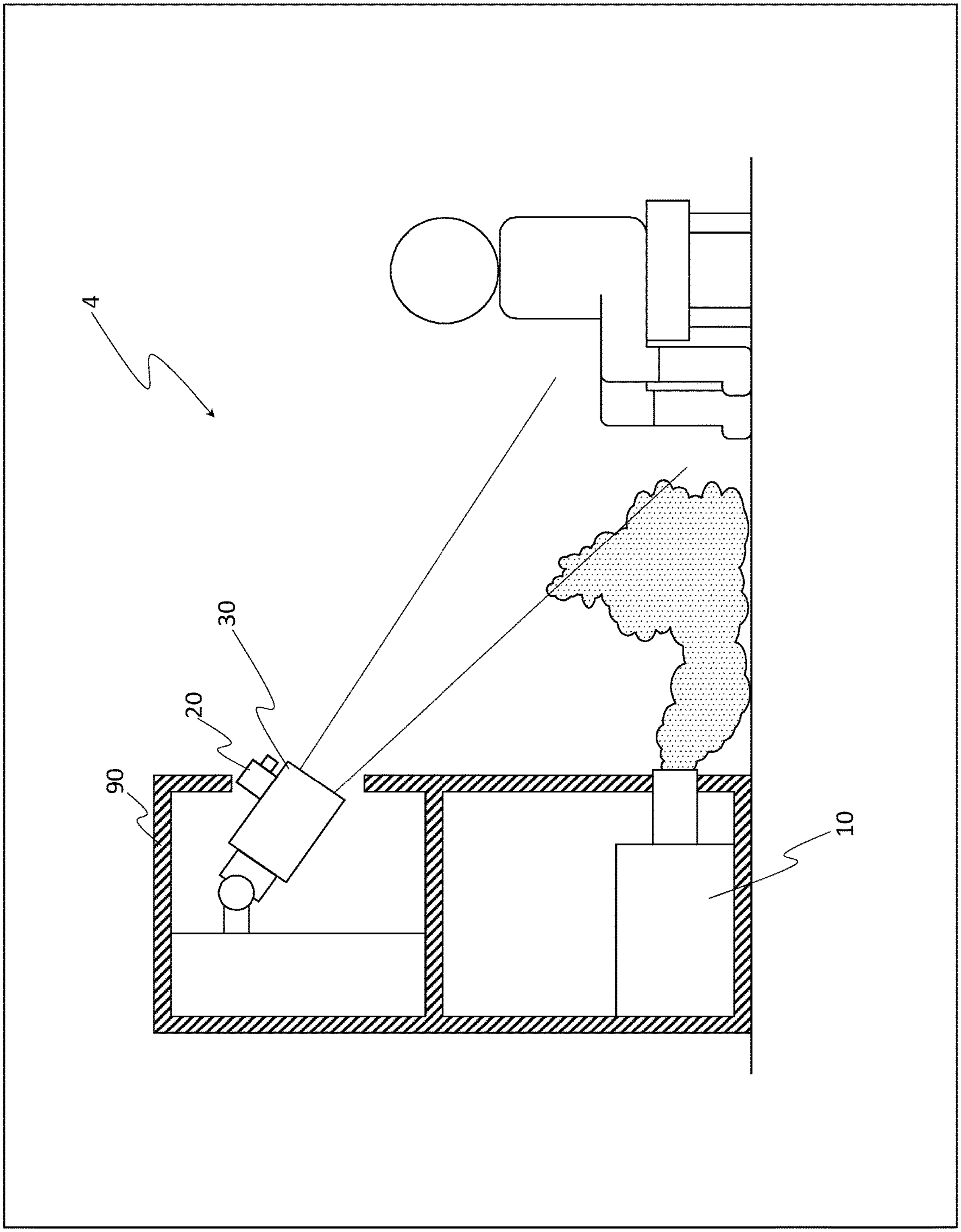
FIG. 10 is an external view of a fine particles space placement control system according to a second embodiment of the present invention.

Next, a second embodiment of the present invention will be described. A fine particles space placement control system 4 according to the second embodiment is used as a relaxation facility. FIG. 10 is an external view of the fine particles space placement control system 4 according to the second embodiment of the present invention.

As shown in FIG. 10, in the fine particles space placement control system 4, a fine particles generator 10 is disposed below an irradiator 30 and discharges a mist consisting of fine particles such that the mist stays over the floor.

Thus, the fine particles generator 10 is able to discharge the mist to the legs of a user sitting on a chair. By removing the fine particles around the legs of the user using infrared irradiation, the diffusion of the fine particles is stopped before the user.

Since the user is warmed by heat caused by infrared irradiation and humidified, the user obtains health promotion effects such as a metabolic improvement and beauty effects based on moisture retention. Since the staying fine particles have an appearance similar to a cloud sea, the user obtains visual effects by viewing the fine particles.

<Other Uses>

Use as Humidifying Heater or Humidifier

Since vapor and heat are generated when removing fine particles, the user can use the above fine particles space placement control systems as a humidifying heater or humidifier while viewing an artificial cloud. Also, since infrared irradiation is used when removing fine particles, the user can obtain heat sterilization effects.

Use as Air Cleaner Using Microorganisms

By adding microorganisms having photosynthetic capacity, such as algae, to fine particles, an air cleaning function of absorbing carbon dioxide and releasing oxygen may be provided for the above fine particles space placement control systems. By pulverizing water, the surface area of water per unit volume and thus the efficiency of gas exchange are maximized.

Use of Artificial Cloud as Decoration for Stage or the Like

An artificial cloud may be used as a part of decoration at a music live hall, an amusement park, or the like. For example, it is conceivable to represent a more illusionary space by causing a cloud to hang over a building of an amusement park. Also, when viewing cherry blossoms or the like outdoors, an artificial cloud may be added as additional decoration.

Use of Cloud as Three-Dimensional Projector

A generated artificial cloud may be used as a projector that projects an advertisement or other images. The fine particles space placement control systems are able to generate denser fine particles than ones generated by existing technologies in a predetermined position and thus to show clearer images to a user.

Use in Game or Attraction

An artificial cloud may be used as an element for enhancing playability, such as an obstacle in airsoft. According to the present invention, an artificial cloud can be generated in any position or shape. Thus, a game can be rendered such that, for example, the visibility of an object is impaired using an artificial cloud, or a more visible place and a less visible place are changed with time due to gradual movement of the position of a cloud.

While the embodiments of the present invention have been described in detail, the scope of the present invention is not limited thereto. Also, various improvements or changes can be made to the embodiments without departing from the spirit and scope of the present invention. Also, the embodiments and modifications can be combined with each other.

The matters described in the embodiments are described as Supplementary Notes below.

(Supplementary Note 1)

A fine particles space placement control system including:
- a fine particles generator configured to generate fine particles in a predetermined space by applying external energy to a liquid or a solid; and
- an irradiator configured to remove some of the fine particles generated by the fine particles generator by irradiating the some fine particles with an electromagnetic wave.

(Supplementary Note 2)

The fine particles space placement control system according to (Supplementary Note 1), wherein the irradiator irradiates the some fine particles with infrared light as the electromagnetic wave.

(Supplementary Note 3)

The fine particles space placement control system according to (Supplementary Note 1) or (Supplementary Note 2), wherein the fine particles generator includes an ultrasonic vibrator configured to generate the fine particles by pulverizing a liquid using ultrasound vibration.

(Supplementary Note 4)

The fine particles space placement control system according to any one of (Supplementary Note 1) to (Supplementary Note 3), including a diffuser configured to diffuse the fine particles generated by the fine particles generator to the predetermined space.

(Supplementary Note 5)

The fine particles space placement control system according to (Supplementary Note 4), wherein the diffuser diffuses the fine particles generated by the fine particles generator to the predetermined space by sending air to the fine particles.

(Supplementary Note 6) The fine particles space placement control system according to (Supplementary Note 4) or (Supplementary Note 5), wherein the diffuser diffuses the fine particles to the predetermined space by sucking air in the predetermined space.

(Supplementary Note 7)

The fine particles space placement control system according to any one of (Supplementary Note 1) to (Supplementary Note 6), including:
- a recognizer configured to recognize a form of the fine particles generated by the fine particles generator; and
- a controller configured to control the irradiator by comparing the form of the fine particles recognized by the recognizer and form information indicating a form of fine particles to be shaped.

(Supplementary Note 8)

The fine particles space placement control system according to (Supplementary Note 7), wherein
- the controller includes a receiver configured to receive input of the form information, and
- the controller urges a user to select, as the form information, at least one of a shape of a cloud and a period condition, a time condition, and an area condition under which the cloud occurs and to input the selected form information to the receiver.

(Supplementary Note 9)

The fine particles space placement control system according to (Supplementary Note 7) or (Supplementary Note 8), wherein the irradiator includes an actuator configured to be actuated under control of the controller.

(Supplementary Note 10)

The fine particles space placement control system according to any one of (Supplementary Note 7) to (Supplementary Note 9), wherein the irradiator is formed integrally with the recognizer.

(Supplementary Note 11)

The fine particles space placement control system according to any one of (Supplementary Note 7) to (Supplementary Note 10), wherein
- the irradiator includes multiple irradiators, and
- the irradiators are disposed in positions opposite to each other with respect to the predetermined space in which the fine particles generator generates the fine particles.

(Supplementary Note 12)

The fine particles space placement control system according to any one of (Supplementary Note 1) to (Supplementary Note 11), including a light source configured to irradiate the fine particles generated by the fine particles generator with visible light.

(Supplementary Note 13)

The fine particles space placement control system according to (Supplementary Note 12), wherein the light source radiates a background imitating a sky.

(Supplementary Note 14) The fine particles space placement control system according to any one of (Supplementary Note 1) to (Supplementary Note 13), including a dehumidifier configured to dehumidify the predetermined space.

(Supplementary Note 15) The fine particles space placement control system according to any one of (Supplementary Note 1) to (Supplementary Note 14), wherein the fine particles generator includes an ultraviolet irradiator configured to disinfect at least one of the generated fine particles and a raw material of the fine particles by irradiating the at least one with ultraviolet light.

(Supplementary Note 16)

The fine particles space placement control system according to any one of (Supplementary Note 1) to (Supplementary Note 15), wherein the fine particles generator has a discharge port through which the generated fine particles are discharged, and the discharge port is covered by a porous filter.

(Supplementary Note 17)

The fine particles space placement control system according to any one of (Supplementary Note 1) to (Supplementary Note 16), wherein the fine particles generator includes a temperature control mechanism configured to control a temperature of at least one of the generated fine particles and a raw material of the fine particles.

(Supplementary Note 18)

A fine particles space placement control method, including:

generating, by a computer, fine particles by applying external energy to a liquid or a solid; and removing, by a computer, some of the fine particles generated by a fine particles generator by irradiating the some fine particles with an electromagnetic wave.

(Supplementary Note 19)

A fine particles space placement control program for causing a computer to:

generate fine particles by applying external energy to a liquid or a solid; and remove some of the fine particles generated by a fine particles generator by irradiating the some fine particles with an electromagnetic wave.

(Supplementary Note 20)

A fine particles generation method comprising:

generating, by a computer, fine particles by pulverizing water using ultrasonic vibration;

supplying, by the computer, the generated fine particles to a predetermined space by sending air to the fine particles;

recognizing, by the computer, a form of the fine particles supplied to the predetermined space;

urging, by the computer, a user to select at least one of a shape of a cloud and a period condition, a time condition, and an area condition under which the cloud occurs and to input the selected at least one as form information indicating a form of fine particles; and comparing, by the computer, the recognized form of the fine particles in the predetermined space and the form information and vaporizing and removing some of the fine particles by irradiating the some fine particles with infrared light, in order to shape the fine particles.

(Supplementary Note 21)

A fine particles generation program for causing a computer to:

generate fine particles by pulverizing water using ultrasonic vibration;

supply the generated fine particles to a predetermined space by sending air to the fine particles;

recognize a form of the fine particles supplied to the predetermined space;

urge a user to select at least one of a shape of a cloud and a period condition, a time condition, and an area condition under which the cloud occurs and to input the selected at least one as form information indicating a form of fine particles; and compare the recognized form of the fine particles in the predetermined space and the form information and vaporize and remove some of the fine particles by irradiating the some fine particles with infrared light, in order to shape the fine particles.

The invention claimed is:

1. A fine particles space placement control system comprising:

a fine particles generator generating fine particles hanging in a predetermined space by applying external energy to a liquid or a solid;

an irradiator removing some of the fine particles generated by the fine particles generator by irradiating the some of the fine particles with an infrared light and thus vaporizing or burning the some of the fine particles, wherein the fine particles generator comprises an ultrasonic vibrator configured to generate a group of liquid particles by pulverizing the liquid using ultrasound vibration;

a recognizer configured to recognize a form of the fine particles generated by the fine particles generator; and a controller configured to:

control the irradiator by comparing the form of the fine particles recognized by the recognizer and form information indicating a form of fine particles to be shaped, identify a range of the fine particles hanging in the predetermined space to be irradiated by the irradiator, and cause the irradiator to irradiate with infrared light to remove the some of the fine particles.

2. The fine particles space placement control system according to claim 1, further comprising a diffuser configured to diffuse the fine particles generated by the fine particles generator to the predetermined space.

3. The fine particles space placement control system according to claim 2, wherein the diffuser diffuses the fine particles generated by the fine particles generator to the predetermined space by sending air to the fine particles.

4. The fine particles space placement control system according to claim 2, wherein the diffuser diffuses the fine particles to the predetermined space by sucking air in the predetermined space.

5. The fine particles space placement control system according to claim 1, wherein the controller further comprises:

a receiver receiving input of the form information, and the controller urges a user to select, as the form information, at least one of a shape of a cloud and a period condition, a time condition, and an area condition under which the cloud occurs and to input the selected form information to the receiver.

6. The fine particles space placement control system according to claim 1, wherein the irradiator comprises an actuator actuated under control of the controller.

7. The fine particles space placement control system according to claim 1, wherein the irradiator is formed integrally with the recognizer.

8. The fine particles space placement control system according to claim 1, wherein the irradiator is disposed opposite to the predetermined space in which the fine particles generator generates the fine particles.

9. The fine particles space placement control system according to claim 1, further comprising a light source irradiating the fine particles generated by the fine particles generator with visible light.

10. The fine particles space placement control system according to claim 9, wherein the light source radiates a background imitating a sky.

11. The fine particles space placement control system according to claim 1, further comprising a dehumidifier configured to dehumidify the predetermined space.

12. The fine particles space placement control system according to claim 1, wherein the fine particles generator comprises an ultraviolet irradiator configured to disinfect at least one of the generated fine particles and a raw material of the fine particles by irradiating the at least one with ultraviolet light.

13. The fine particles space placement control system according to claim 1, wherein the fine particles generator has a discharge port through which the generated fine particles are discharged, and the discharge port is covered by a porous filter.

14. The fine particles space placement control system according to claim 1, wherein the fine particles generator comprises a temperature control mechanism controlling a temperature of at least one of the generated fine particles and a raw material of the fine particles.

15. A fine particles space placement control method comprising:

generating, by a computer, fine particles hanging in a predetermined space by applying external energy to a liquid or a solid;

removing, by the computer, some of the fine particles generated by a fine particles generator by irradiating the some of the fine particles with an infrared light and thus vaporizing or burning the some of the fine particles, wherein the fine particles generator comprises an ultrasonic vibrator configured to generate a group of liquid particles by pulverizing the liquid using ultrasound vibration;

recognizing, by a recognizer, a form of the fine particles generated by the fine particles generator;

controlling, by a controller, the irradiator by comparing the form of the fine particles recognized by the recognizer and form information indicating a form of fine particles to be shaped;

identifying, by the controller, a range of the fine particles hanging in the predetermined space to be irradiated by the irradiator, and causing, by the controller, the irradiator to irradiate with infrared light to remove the some of the fine particles.

16. A non-transitory computer-readable storage medium, storing computer-readable instruction thereon, which, when executed by processor, cause the processor to execute a method comprising:

generating fine particles hanging in a predetermined space by applying external energy to a liquid or a solid;

removing some of the fine particles generated by a fine particles generator by irradiating the some of the fine particles with an infrared light and thus vaporizing or burning the some of the fine particles, wherein the fine particles generator comprises an ultrasonic vibrator configured to generate a group of liquid particles by pulverizing the liquid using ultrasound vibration;

recognizing, by a recognizer, a form of the fine particles generated by the fine particles generator;

controlling, by a controller, the irradiator by comparing the form of the fine particles recognized by the recognizer and form information indicating a form of fine particles to be shaped;

identifying, by the controller, a range of the fine particles hanging in the predetermined space to be irradiated by the irradiator, and causing, by the controller, the irradiator to irradiate with infrared light to remove the some of the fine particles.

* * * * *